United States Patent [19]

Tsukamoto et al.

[11] Patent Number: 5,616,094
[45] Date of Patent: Apr. 1, 1997

[54] HYDRAULIC CONTROL SYSTEM FOR AUTOMATIC TRANSMISSION

[75] Inventors: Kazumasa Tsukamoto, Toyota; Masahiko Ando, Okazaki; Akira Fukatsu; Toshiyuki Mae, both of Anjo; Motoyuki Sakai, Aichi-ken; Tetsuo Hamajima, Toyota; Masato Kaigawa, Toyota; Kagenori Fukumura, Toyota; Hidehiro Oba, Numazu; Yasuo Hojo, Nagoya; Atsushi Tabata, Okazaki; Nobuaki Takahashi, Toyota, all of Japan

[73] Assignees: Aisin Aw Co., Ltd.; Toyota Jidosha Kabushiki Kaisha, both of Japan

[21] Appl. No.: 562,386

[22] Filed: Nov. 24, 1995

[30] Foreign Application Priority Data

Dec. 2, 1994 [JP] Japan .................................. 6-329492
Dec. 2, 1994 [JP] Japan .................................. 6-329494

[51] Int. Cl.⁶ .............................................. F16H 61/00
[52] U.S. Cl. ............................................................ 475/128

[58] Field of Search .................................... 475/127, 128; 477/162

[56] References Cited

U.S. PATENT DOCUMENTS

5,109,734  5/1992  Fujiwara ................................... 475/128
5,291,804  3/1994  Kashihara et al. ....................... 475/128

*Primary Examiner*—Dirk Wright
*Attorney, Agent, or Firm*—Lorusso & Loud

[57] ABSTRACT

A hydraulic control system for an automatic transmission includes a regulator valve in a hydraulic circuit for supplying pressure to a servo of a frictional engagement element. The regulator valve has an input port, an output port and a drain port. A valve member of the regulator valve includes a pressure receiving area fed with a feedback pressure from the portion of the hydraulic circuit between the regulator valve and the servo, and another pressure receiving area selectively fed with pressure from a signal pressure source. A further pressure receiving area, having a surface area different from the another pressure receiving area, is constantly fed pressure from the signal pressure source.

6 Claims, 7 Drawing Sheets

|  | C-0 | C-1 | C-2 | B-0 | B-1 | B-2 | B-3 | B-4 | F-0 | F-1 | F-2 |
|---|---|---|---|---|---|---|---|---|---|---|---|
| N |  |  |  | ○ |  |  |  |  |  |  |  |
| Rev |  |  | ○ | ○ |  |  |  | ○ |  |  |  |
| 1st | ○ | ○ |  |  |  |  |  | ● | ○ |  | ○ |
| 2nd | ● | ○ |  |  |  |  | ○ |  | ○ |  |  |
| 3rd | ○ | ○ |  |  | ● | ○ |  |  | ○ | ○ |  |
| 4th | ○ | ○ | ○ |  |  | ◎ |  |  | ○ |  |  |
| 5th |  | ○ | ○ | ○ |  | ◎ |  |  |  |  |  |

HYDRAULIC CONTROL SYSTEM FOR AUTOMATIC TRANSMISSION

BACKGROUND OF THE INVENTION

1. Field of the Invention

The present invention relates to a hydraulic control system for an automatic transmission and, more particularly, to a control system of a hydraulic servo for applying/releasing the frictional engagement elements of a transmission mechanism of an automatic transmission.

2. Related Art

In the automatic transmission of the prior art, the hydraulic servo for applying/releasing the frictional engagement elements (e.g., brakes or clutches) arranged in the gear train so as to effect a shift is controlled by the hydraulic control system. In one mode, the feed pressure to the hydraulic servo is directly controlled by a pressure regulator valve which is fed on one hand with a solenoid valve as a control signal pressure according to the running state of the vehicle and on the other hand with the feed pressure as a feedback pressure.

In the control of the feed pressure to the hydraulic servo, generally speaking, at a shifting process, a relatively low oil pressure is fed to the hydraulic servo in a manner to correspond to a torque capacity required by the frictional engagement elements. At the end of the shift, a high oil pressure corresponding to the line pressure has to be finally fed to the hydraulic servo thereby to ensure the state in which the torque capacity of the frictional engagement element is sufficiently retained. In view of the aforementioned construction of the prior art, this construction has to control the feed pressure to the hydraulic servo, from a low level for achieving the engagement to a level as high as the line pressure after the engagement is achieved, wholly by the solenoid pressure. As a result, the feed pressure cannot be raised to the high pressure corresponding to the line pressure unless a high control gain is taken. With this high control gain, on the contrary, the change of the feed pressure in relation to the change of the solenoid pressure excessively increases at the time of controlling the feed pressure at a low level before achievement of the engagement so that the feed pressure is highly dispersed with a slight dispersion of the solenoid valve thereby to deteriorate the pressure regulating accuracy.

As disclosed in Japanese Patent Laid-Open No. 215220/1993, there has been a technique in which the control gain is set to a low value, while ensuring the rise of the oil pressure to the line pressure, to improve the pressure regulating accuracy by controlling the pressure regulation using the solenoid pressure, while the level of the feed pressure to the hydraulic servo is being raised during a shifting process, with the use of the solenoid pressure and by interrupting the drainage of the feed pressure to establish a non-control state of no drainage when the level of the feed pressure is raised after the end of the shift to a level as high as the line pressure. Specifically, a pressure regulator valve to be controlled by the solenoid valve is disposed in a feed oil passage to the hydraulic servo of the frictional engagement element, and a change-over valve is disposed in the drain oil passage of the pressure regulator valve, so that the drainage after the control of the feed pressure of the pressure regulator valve by the solenoid pressure is interrupted by the change-over valve. However, this construction raises a problem that the pressure regulating accuracy is deteriorated.

SUMMARY OF THE INVENTION

It is, therefore, a main object of the present invention to provide a hydraulic control system for an automatic transmission, which can control the feed of the oil pressure to the hydraulic servo in the pressure regulating accuracy, while the frictional engagement element is being applied, and can feed a high oil pressure to the hydraulic servo.

Another object of the present invention is to prevent the hydraulic control system from having its oil pressure released during the drainage from the hydraulic servo in the course of releasing the frictional engagement element.

In order to solve the above-specified problem, according to a first aspect of the present invention, there is provided a hydraulic control system for an automatic transmission, which system comprises: a frictional engagement element; a hydraulic servo for controlling the application/release of the frictional engagement element; an oil passage connected to the hydraulic servo for feeding/releasing an oil pressure to the hydraulic servo; a pressure regulator valve disposed in the oil passage; and signal pressure generating means for applying a signal pressure to the pressure regulator valve, characterized: in that the oil passage includes: a first oil passage for feeding the oil pressure to the pressure regulator valve; and a second oil passage for feeding the oil pressure from the pressure regulator valve to the hydraulic servo; in that the pressure regulator valve includes: a valve member; an input port connected to the first oil passage; an output port connected to the second oil passage; and a drain port connected to a drain oil passage; in that the valve member has: a first pressure receiving area to be fed with the feedback pressure of the second oil passage in a direction to provide the communication between the output port and the drain port; a second pressure receiving area to be fed with the signal pressure in a direction to provide the communication the output port and the drain port; and a third pressure receiving area having an area different from that of the second pressure receiving area; and in that the signal pressure generating means feeds the signal pressure to the third pressure receiving area at all times and the signal pressure selectively to the second pressure receiving area.

According to a second aspect of the present invention, the third pressure receiving area of the valve member has a larger diameter than that of the second pressure receiving area and is Fed with the signal pressure in a direction to provide the communication between the output port and the input port.

According to a third aspect of the present invention, the valve member includes: a spool having the First pressure receiving area: and a plunger arranged coaxially with the spool and having the second and third pressure receiving areas. The hydraulic control system further comprises a spring arranged between the spool and the plunger. The spring is urged to bring the spool and the plunger apart from each other.

According to a Fourth aspect of the present invention, the frictional engagement element is applied/released to effect a shift from a gear stage to another gear stage. The signal pressure generating means includes a change-over valve for changing the application/interruption of the signal pressure to the second pressure receiving area. The change-over valve applies the signal pressure to the pressure receiving area at at least a shifting time from a first gear stage to a second gear stage and interrupts the application of the signal pressure to the second pressure receiving area at the end of the shift.

According to a fifth embodiment of the present invention, the frictional engagement element is a first frictional engagement element. The hydraulic control system further comprises: a second frictional engagement element to be applied when the first frictional engagement element is released; and a second hydraulic servo for controlling the application/ release of the second frictional engagement element. The valve member has a fourth pressure receiving area to be fed with the applying pressure to the second hydraulic servo in the direction to provide the communication of the output port with the drain port.

According to a sixth feature of the present invention, the first frictional engagement element and the frictional engagement element establish a predetermined gear stage when the first frictional engagement element is released whereas the second frictional engagement element is applied. The change-over valve interrupts the application of the signal pressure to the second pressure receiving area at at least the predetermined shifting time.

According to the present invention adopting such construction of the first feature, in case the signal pressure from the signal pressure generating means is applied, at the time of feeding the oil pressure to the hydraulic servo, to both the second pressure receiving area and the third pressure receiving area having an area different from that of the former, the signal pressure acts upon the relatively small pressure receiving area, which is substantially defined by the difference between the second pressure receiving area and the third pressure receiving area, so that the feed of the oil pressure to the hydraulic servo can be controlled in the small control gain state with a high pressure regulating accuracy. In case, moreover, the application of the signal pressure is made not to the second pressure receiving area but only to the third pressure receiving area, the pressure receiving area of the signal pressure can be relatively enlarged to raise the oil pressure to be fed to the hydraulic servo to a high level with a high control gain.

In case the third pressure receiving area is made larger than the second pressure receiving area as in the construction of the second feature so that the signal pressure is applied in the direction to provide the communication between the output port and the input port, in addition to the above-specified effect, the drainage control of the oil pressure is started from the state, in which the signal pressure acts in the direction to provide the communication between the output port and the input port, by applying the signal pressure from the signal pressure generating means to both the second pressure receiving area and the third pressure receiving area having a larger diameter than that of the former at the time of draining the oil pressure from the hydraulic servo. As a result, it is possible to prevent the pressure drop which might otherwise be caused by the abrupt communication between the output port and the drain port. Since, moreover, the signal pressure is also applied to the second pressure receiving area, the oil pressure drainage can be controlled in a high pressure regulating accuracy from a high oil pressure by a small control gain.

Generally speaking, the signal pressure from the signal pressure generating means is so seriously dispersed at its initial output stage that the pressure regulating accuracy is deteriorated if the signal pressure is caused to directly act upon the spool from the beginning. According to the construction of the third feature, however, the signal pressure is applied at first to the plunger so that the displacement, if any, of the spool establishes the communication between the output port and the input port till the plunger comes into contact with the spool against the force of the spring. As a result, it is possible to suppress the regulating action of the oil pressure to the hydraulic servo before the signal pressure reaches a slightly higher output valve than that having a large dispersion.

According to the construction of the fourth feature, moreover, the control gain is reduced to effect the control in a high pressure regulating accuracy by applying the signal pressure to the second pressure receiving area by the change-over valve of the signal pressure generating means till the oil pressure corresponding to the torque capacity required by the frictional engagement element at the shifting time. After this, the application of the signal pressure to the second pressure receiving area is interrupted by the change-over valve till the oil pressure capable of sufficiently retaining the torque capacity of the frictional engagement element, so that the control gain is enlarged to raise the oil pressure to a high level. As a result, it is possible to feed the oil pressure in a high pressure regulating accuracy to the hydraulic servo throughout the shifting step from the first gear stage to the second gear stage.

[0015]

According to the construction of the fifth feature, still moreover, even in the hydraulic control system for controlling the releasing pressure from the hydraulic servo of the first frictional engagement element in accordance with the feed pressure to the hydraulic servo of the second frictional engagement element, the control gain of the pressure regulator valve for controlling the drainage is enlarged by the method of applying the signal pressure like before when the first frictional engagement element is released, that is, when the oil pressure from the hydraulic servo is drained. As a result, it is possible to establish a force to stand against the oil pressure which is applied from the hydraulic servo of the second frictional engagement element at the engaging side to the fourth pressure receiving area of the pressure regulator valve.

DESCRIPTION OF THE PREFERRED EMBODIMENT

Figure 3:
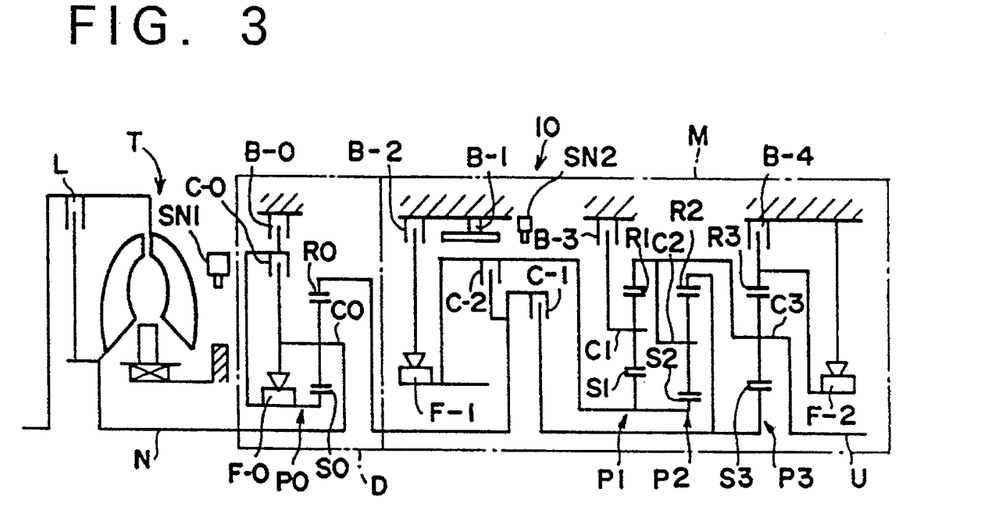
FIG. 3 is a skeleton diagram showing a transmission mechanism portion of the automatic transmission.

The present invention will be described in the following in connection with its embodiments with reference to the accompanying drawings. Here will be described at first the schematic construction of the entirety of an automatic transmission. As shown in FIG. 3, an automatic transmission 10 has its mechanical portion constructed, in this embodiment, to have five speeds by combining an auxiliary transmission mechanism D composed of a pre-overdrive planetary gear unit and a main transmission mechanism M composed of a simply connected 3-planetary gear trains to establish four forward speeds and one reverse. The mechanical portion thus constructed is connected to a torque converter T having a lockup clutch L.

The auxiliary transmission mechanism D is equipped with: a one-way clutch F-0 In association with a sun gear S0, a carrier C0 and a ring gear R0; a multi-disc clutch C-0 in parallel with the one-way clutch F-0; and a multi-disc brake B-0 in series with the multi-disc clutch C-0. On the other hand, the main transmission mechanism M is equipped with three sets of simply connected gear units P1 to P3 in which are suitably directly connected the individual transmission elements composed of sun gears S1 to S3, carriers C1 to C3 and ring gears R1 to R3. The main transmission mechanism M is arranged with multi-disc clutches C-1 and C-2, a band brake B-1, multi-disc brakes B-2 to B-4, and one-way clutches F-1 and F-2 in association with the transmission elements of the individual gear units. Incidentally, in FIG. 2, reference characters SN1 designate a C0 sensor for detecting the drum rotation of the clutch C-0, and characters SN2 designate a C2 sensor for detecting the drum rotation of the clutch C-2. Moreover, the individual clutches and brakes are equipped with hydraulic servo units composed of piston-cylinder mechanisms for applying/releasing their friction members, although not shown.

Figure 5:
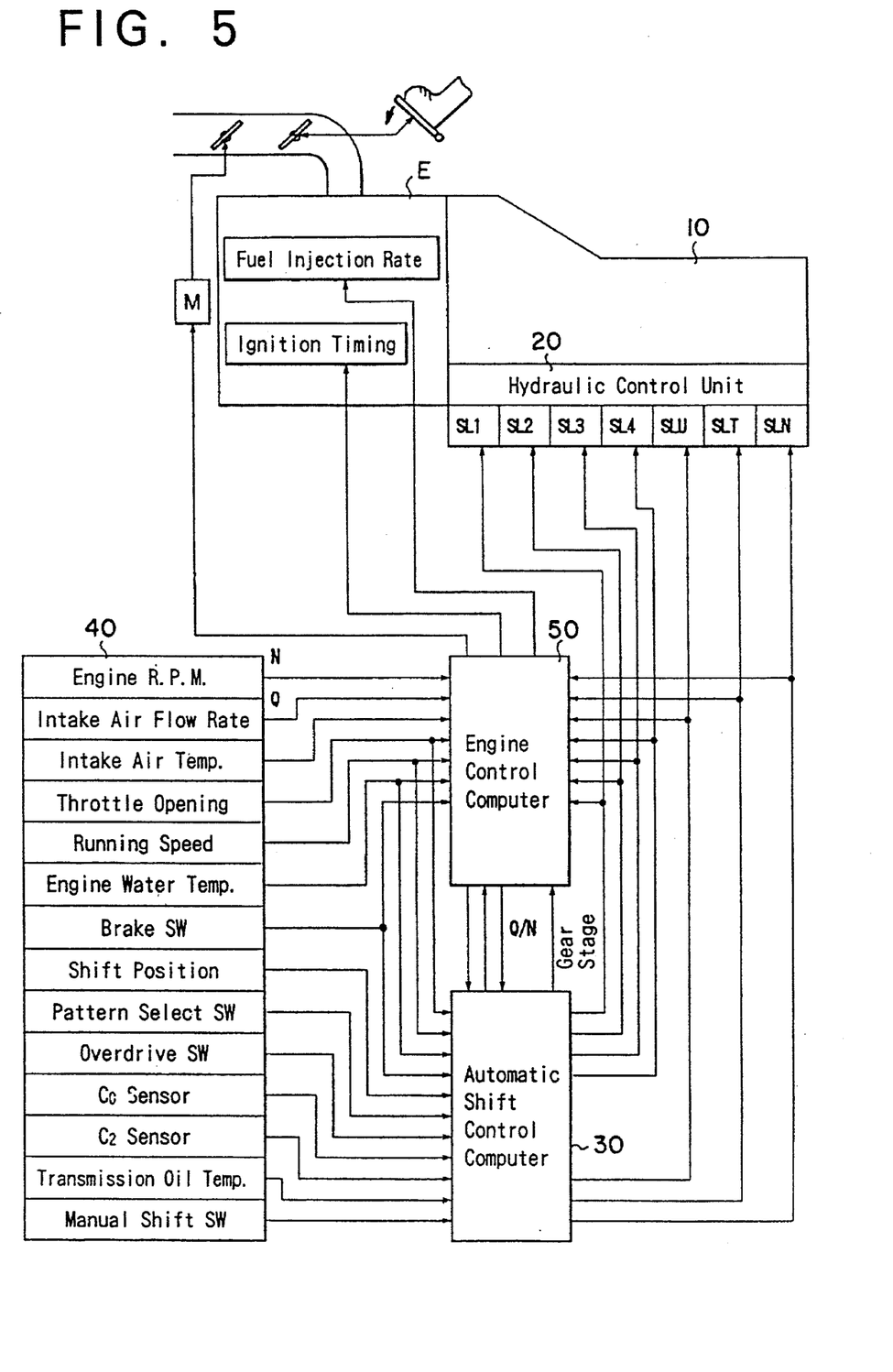
FIG. 5 is a block diagram showing a system construction of the automatic transmission.

As shown in FIG. 5, the automatic transmission 10 is equipped with: a hydraulic control system 20 for controlling the mechanical portion having the aforementioned construction, a torque converter and the lockup clutch; and the not-shown oil pump which is built in the mechanical portion as the oil pressure source for the hydraulic control system 20. The automatic transmission 10 is connected, when mounted on the vehicle, to an engine E and has its hydraulic control system 20 connected with an automatic transmission control computer 30 through individual solenoid valves SL1 to SL4 and individual linear solenoid valves SLN, SLT and STU, which are built in the hydraulic control system 20. The automatic transmission control computer 30 is connected with: a variety of sensors 40, which are arranged in the individual portions of the vehicle including the engine E and the automatic transmission 10; and an engine control computer 50.

In this automatic transmission 10, the rotation of the engine E shown in FIG. 5 is transmitted to the input shaft N of the auxiliary transmission mechanism D through the torque converter T shown in FIG. 3. Moreover, the rotation of the input shaft N is inputted to the sun gear S3 of the gear unit P3 under the control of the hydraulic control system with the clutch C-0 being applied to directly connect the auxiliary transmission mechanism D, with the clutch C-1 of the main transmission mechanism M being applied, with all the remaining frictional engagement elements being released, and is outputted as a 1st-speed rotation to an output shaft U from the carrier C3 by obstructing the backward rotation of the ring gear R3 by the one-way clutch F-2.

Next, a 2nd speed is established when the auxiliary transmission mechanism D is directly connected so that the clutch C-1 and the brake B-3 are applied. At this time, the input having entered the ring gear R2 of the gear unit P2 is outputted, by using the carrier C1 of the gear unit P1 as a reaction element, to the carrier C2 of the gear unit P2 and the ring gear R1 of the gear unit P1, as directly connected to the former, so that it establishes the 2nd-speed rotation of the output shaft U.

On the other hand, a 3rd speed is established, too, when the auxiliary transmission mechanism D is directly connected to apply the clutch C-1 and the brake B-2 while releasing the others. At this time, the input having entered the ring gear R2 of the gear unit P2 is outputted to the carrier C2 by using the sun gear S2 as a reaction element so that it establishes the 3rd-speed rotation of the output shaft U.

Moreover, a 4th speed is established, too, when the auxiliary transmission mechanism D is directly connected to apply both the clutch C-1 and the clutch C-2. At this time, the input rotation is inputted to the ring gear R2 and the sun gear S2 so that the gear unit P2 is directly connected to output the input rotation as it is. Still moreover, a 5th-speed rotation is established, when the main transmission mechanism M is in the state of the aforementioned 4th-speed rotation, by releasing the clutch C-0 and applying the brake B-0 to fix the sun gear S0 thereby to accelerate the auxiliary transmission mechanism D. On the other hand, the reverse is established, when the auxiliary transmission mechanism D is in the aforementioned state, by applying the clutch C-2 and the brake B-4 of the main transmission mechanism M. At this time, the input having entered the sun gear S2 of the gear unit P2 is outputted as the backward rotations of the carriers C2 and C3 of the gear units P2 and P3 using the ring gear R3 as a reaction element.

Figure 4:
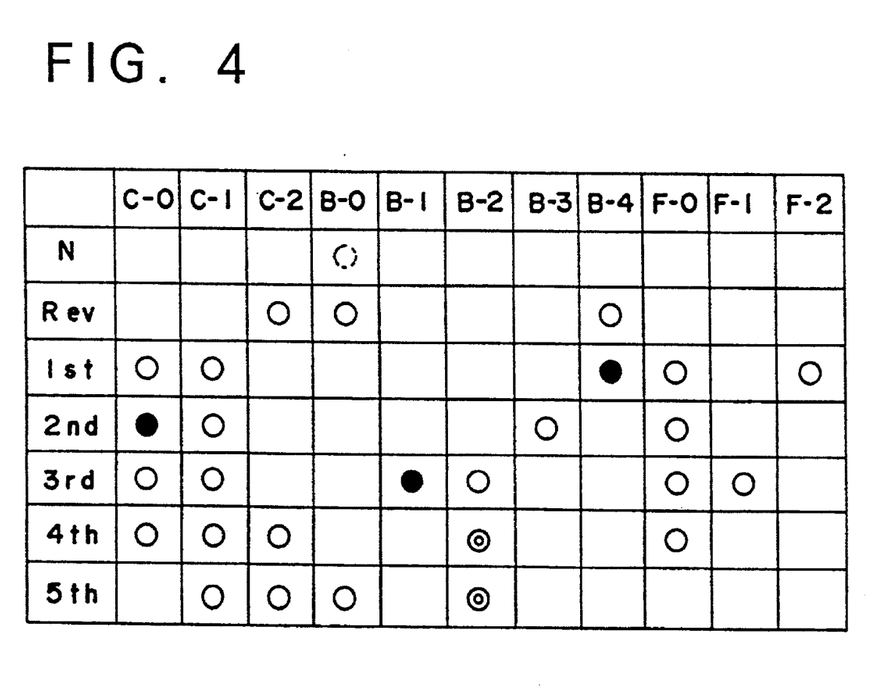
FIG. 4 is an operation chart of the automatic transmission.

The applied/released relations of the individual frictional engagement elements and the one-way clutches at the aforementioned Individual gear stages are tabulated in the operation chart of FIG. 4. In FIG. 4: blank circles o designate the application for the clutches and brakes and the lock for the one-way clutches; solid circles ● designate the application only at the engine braking time; a broken circle o designates the application or release; and double circles ⊙ designate the application withdrawing the participation in the power transmission.

Figure 1:
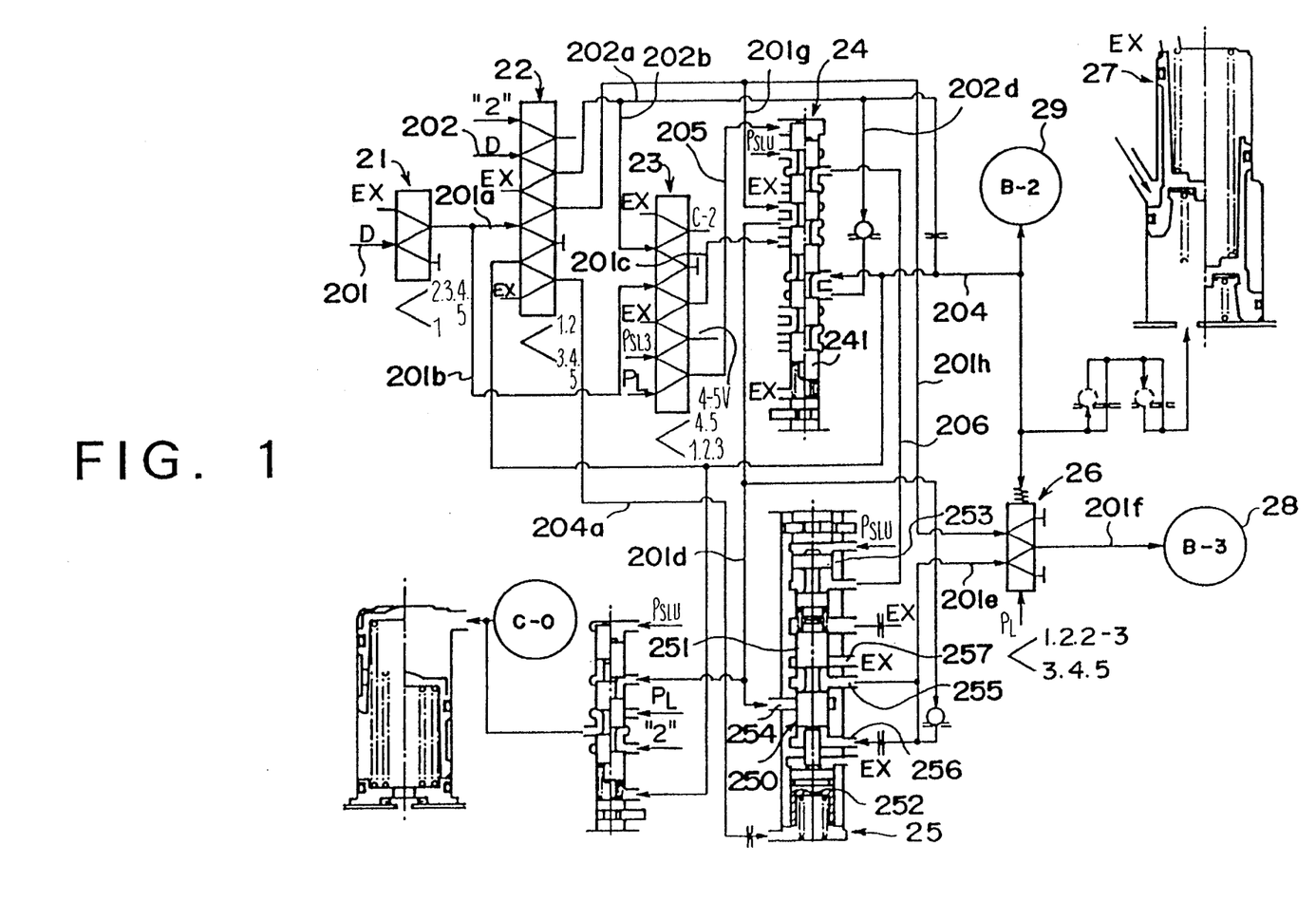
FIG. 1 is a circuit diagram of a portion of a hydraulic control system for an automatic transmission according to an embodiment of the present invention.

In the automatic transmission 10 thus constructed, according to the present invention, a first frictional engagement element is exemplified by the brake B-3, and the second frictional engagement element is exemplified by the brake B-2. Specifically, as only the related portion is shown in FIG. 1, the circuit portion is equipped with: the brake B-3; a hydraulic servo 28 for controlling the application/release of the brake B-3; an oil passage 201 connected to the hydraulic servo 28 for feeding/releasing the oil pressure to/from the hydraulic servo 28; a B-3 control valve 25 disposed in the oil passage 201 for acting as the pressure regulator valve; and the signal pressure generating means (i.e., the linear solenoid valve SLU and so on, as shown in FIG. 5) for applying the signal pressure to the B-3 control valve 25.

The oil passage 201 is composed of a first oil passage 201$d$ for feeding the oil pressure to the B-3 control valve 25, and second oil passages 201$e$ and 201$f$ for feeding the oil pressure from the B-3 control valve 25 to the hydraulic servo 28. The B-3 control valve 25 is composed of a valve member 250, an input port 254 connected to the first oil passage 201$d$, an output port 255 connected to the second oil passage 201$e$, and a drain port 257 connected to the drain oil passage EX.

Figure 2:
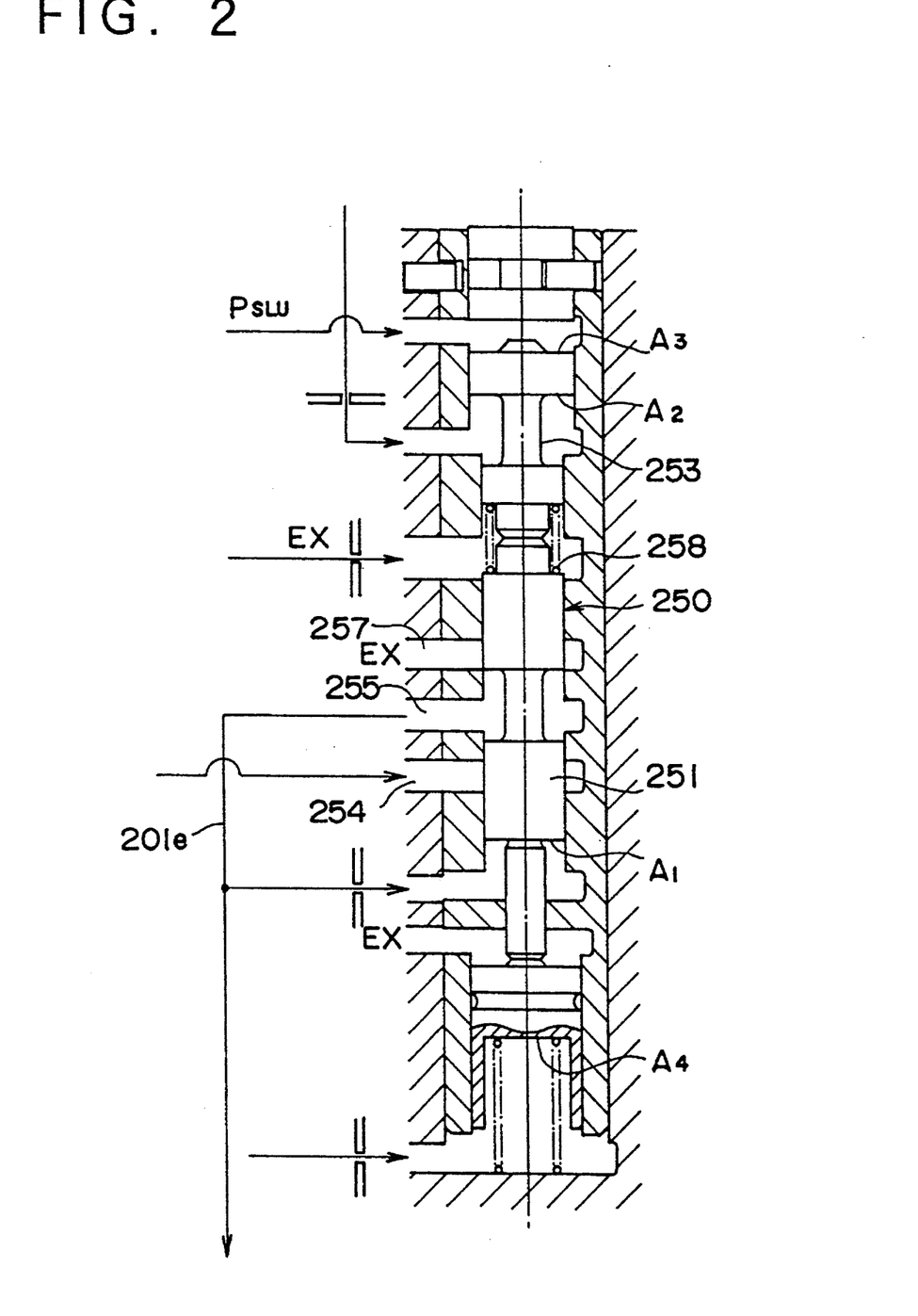
FIG. 2 is an enlarged section showing the detail of a pressure regulator valve of the hydraulic control system.

As shown in an enlarged scale in FIG. 2, the valve member 250 has: a first pressure receiving area $A_1$ to be fed with the feedback pressure of the second oil passage 201$e$ in a direction to provide the communication between the output port 255 and the drain port 257; a second pressure receiving area $A_2$ to be fed with a signal pressure ($P_{SLU}$) in the direction to provide the communication between the output port 255 and the drain port 257; and a third pressure receiving area $A_3$ having a larger diameter than that of the second pressure receiving area $A_2$ and adapted to be fed with the signal pressure ($P_{SLU}$) in the direction to provide the communication between the output port 255 and the input port 254. The signal pressure generating means (i.e., the linear solenoid valve SLU and so on) applies the signal pressure ($P_{SLU}$) at all times to the third pressure receiving area $A_3$ and selectively to the second pressure receiving area $A_2$.

The valve member 250 of the B-3 control valve 25 is composed of a spool 251 having the first pressure receiving area $A_1$, and a plunger 253 arranged coaxially with the spool 251 and having the second and third pressure receiving areas $A_2$ and $A_3$. Between the spool 251 and the plunger 253, there is arranged a spring 258 which is biased to bring the spool 251 and the plunger 253 apart from each other.

Reverting to FIG. 1, the brake B-3 is exemplified in the present embodiment by the first frictional engagement element for establishing a first gear stage, i.e., a 2nd speed of the automatic transmission, and the brake B-2 is provided as the second frictional engagement element to be applied to establish a second gear stage, i.e., a 3rd speed of the automatic transmission when the brake B-3 is released. The signal pressure generating means is constructed to have a B-2 release valve 24 acting as a change-over valve for switching the application/release of the signal pressure ($P_{SLU}$) to the second pressure receiving area $A_2$. The B-2 release valve 24 applies the signal pressure ($P_{SLU}$) to the third pressure receiving area $A_3$ at at least a shifting time from the 2nd speed to the 3rd speed and interrupts the application of the third pressure receiving area $A_3$ at the end of the shift.

The brake B-2 to be applied when the brake B-3 is released is equipped with a hydraulic servo 29 for controlling its application/release. The valve member 250 of the B-3 control valve 25 has a fourth pressure receiving area $A_4$ to be fed with the engaging pressure to the hydraulic servo 29 in the direction to provide the communication between the output port 255 and the drain port 257.

The circuit portion, which is directly related to the regulation and the feed/release of the oil pressure of the hydraulic servos 28 and 29 for applying/releasing the individual friction members of the brake B-3 and the brake B-2 in addition to the aforementioned individual elements, is arranged with a 1–2 shift valve 21, a 2–3 shift valve 22, a 3–4 shift valve 23, a B-2 release valve 24, a B-3 control valve 25, a relay valve 26 and a B-2 accumulator 27. These hydraulic components are controlled, as shown in FIG. 4, by the solenoid valves SL1 to SL4 for switching the individual shift valves, a lockup linear solenoid valve SLU, the accumulator control linear solenoid valve SLN for controlling the B-2 accumulator 27 and its back pressure, the linear solenoid valve SLT for outputting a control signal according to the engine load, and so on. Incidentally, the feed of the oil pressure to the control valve 25 for regulating the brake B-3 oil pressure is effected through the 1–2 shift valve 21. Between the control valve 25 and the brake B-3, moreover, there Is arranged the relay valve 26 to be controlled by the oil pressure coming from the brake B-2.

The connections between the aforementioned individual valves and oil passages will be described in detail in the following. A D-range oil passage 201 leading to the not-shown manual valve is branched through the 1–2 shift valve 21, and one branch oil passage 201a is connected through the 2–3 shift valve 22, via an oil passage 201h to the relay valve 26 and further through the valve 26 to the brake B-3 oil passage 201f. The other branch oil passage 201b leads through the 3–4 shift valve 23, an oil passage 201c, the B-2 release valve 24 and the oil passage 201d to the input port 254 of the B-3 control valve 25, from which the oil passage 201b is connected through the oil passage 201e to the relay valve 26.

The other D-range pressure oil passage 202 leading to the manual valve is branched through the 2–3 shift valve 22, and one branch oil passage 202a is connected through an orifice to a brake B-2 oil passage 204. This oil passage 204 is connected through the B-2 release valve 24 and a check valve to the oil passage 202a and through an orifice to the accumulator 27. The other branch oil passage 202b is connected through the 3–4 shift valve 23 to the hydraulic servo of the clutch C-2.

The 3–4 shift valve 23 is so connected through a solenoid valve signal pressure oil passage 205 to the B-2 release valve 24 as not only to provide and interrupt the communication between the two oil passages 201b and 202b but also to apply a solenoid valve SL3 signal pressure ($P_{SL3}$) to The spool end of the B-2 release valve 24.

The B-2 release valve 24 is formed with a bypass circuit for accelerating the drainage of the oil passage of the accumulator 27 at the release end of the brake B-2 and is equipped with a spring-loaded spool 241. The B-2 release valve 24 is fed at the end of the spool 241 with the signal pressure ($P_{SL3}$) of the solenoid valve SL3 by way of the 3–4 shift valve 23 so as to provide and interrupt the communication of a bypass oil passage 202d with the brake B-2 oil passage 204, to switch the communication of the D-range pressure oil passages 201c and 201g with the input port 254 of the B-3 control valve 25, and to switch the application of the signal pressure ($P_{SLU}$) to the pressure receiving area $A_2$ of the B-3 control valve 25 via an oil passage 206 and the connection of an oil passage 206 to the drain. As a result, the input port 254 of the B-3 control valve 25 can be fed with the D-range pressure ($P_D$) from the two oil passages 201a and 201b through the B-2 release valve 24 in parallel.

The B-3 control valve 25 is constructed such that the oil pressure of the oil passage 201e leading to the output port 255 is regulated by controlling the input port 254 with one and the drain port 257 with the other of the two lands, which are formed on the spool 251, by a feedback pressure fed to the end of the spool 251 through a feedback signal pressure inport 256. The construction is further made such that a plunger 252 arranged coaxially with the spool 251 pushes the spool 251 when it is fed at its end face with the brake B-2 applying pressure of an oil passage 204a leading to the oil passage 204 of the brake B-2 through the 2–3 shift valve 22. This B-3 control valve 25 is equipped like before with the plunger 258 which is disposed at the opposite side of the plunger 252 for pushing the spool 251 through the spring 258, such that the solenoid signal pressure ($P_{SLU}$) can be applied to and released from one end face of the plunger 253 at all times and the other end face via the oil passage 206 through the B-2 release valve 24.

Incidentally, the relay valve 26 is a spring-loaded spool type change-over valve, and the brake B-2 pressure of the oil passage 204 and the line pressure ($P_L$) are fed in opposite directions to the end of the spool at the spring-loaded side and to the other spool end, to switch the communications between the brake B-3 oil passage 201f and the oil passages 201e and 201h.

The operations of the circuit thus constructed will be described in the following with reference to the circuit diagram of FIG. 1 and the time charts of FIGS. 6 to 8.

Figure 6:
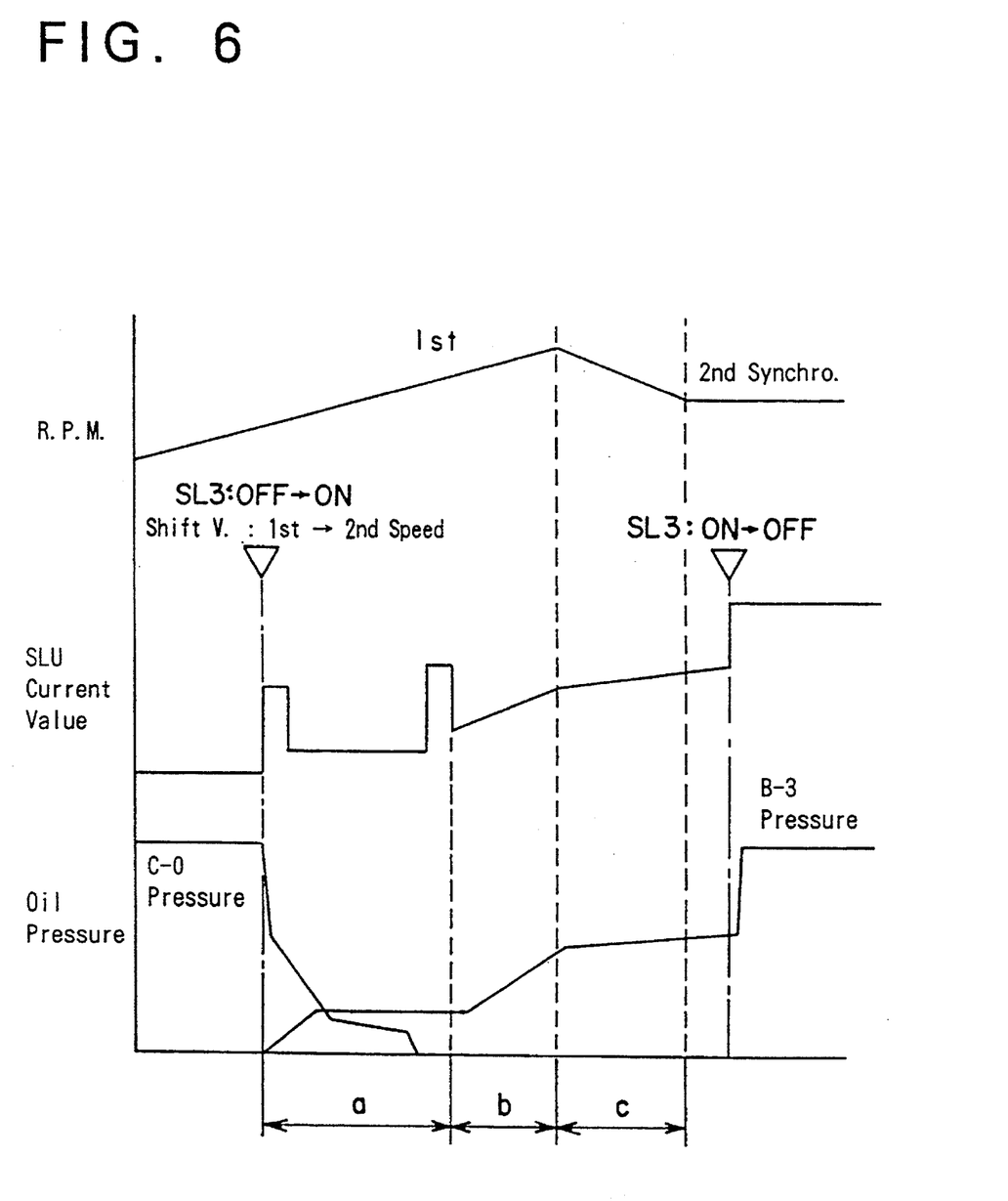
FIG. 6 is a time chart of the automatic transmission at the 1st→2nd shifting time.

(1) 1st→2nd Shift Control Operations (FIG. 6)

If the 1st→2nd shift 2 is decided by the electronic control system, the solenoid valve SL3 is switched from OFF to ON to bring the B-2 release valve 24 to a lefthand half position, as shown in FIG. 1. As a result, the signal pressure ($P_{SLU}$) through the B-2 release valve 24 and the oil passage 206 is applied so that the B-3 control valve 25 comes into a small control gain state. Next, the 1–2 shift valve 21 is changed to a 2nd-speed state to feed the hydraulic servo 28 through the relay valve 26 and the oil passage 201*f* with the D-range pressure ($P_D$), which comes through the (not-shown) manual valve, the oil passage 201, the 2–3 shift valve 22, the oil passage 201*g*, the B-2 release valve 24 and the oil passage 201*d* as the brake B-3 pressure through the B-3 control valve 25, and to drain the clutch C-0 pressure. From now on, the brake B-3 pressure In sections a, b and c, as shown in FIG. 6, is directly controlled by the B-3 control valve 25. Specifically, during the piston stroke (corresponding to the second a) of the hydraulic servo, the oil pressure level for the fast fill is set by the force of the return spring 258 of the hydraulic servo. In the section b, the output ($P_{SLU}$) of the linear solenoid valve SLU is raised at a predetermined rate to change the rotation. In the section c, the linear solenoid valve SLU is subjected to a feedback control according to a target rotation change. When the end of the 1st→2nd speed shift (i.e., in the 2nd synchronization), the solenoid valve signal pressure ($P_{SL3}$) is applied, when the solenoid valve SL3 is turned OFF, to change the B-2 release valve 24 to a righthand half position of FIG. 6 to release the signal pressure ($P_{SLU}$) at the pressure receiving area $A_2$ of the plunger 253 of the B-3 control valve 25 to bring the B-3 control valve 25 into a large gain state. The D-range pressure ($P_D$) through the B-2 release valve 24, as switched from another passage 201*c* through the 1–2 shift valve 21, is continuously fed to the hydraulic servo through the B-3 control valve 25 to raise the brake B-3 pressure quickly to the line pressure ($P_L$) until the shift is ended. As a result, in the 2nd-speed (2nd) steady state, the spool 251 is locked in the lowermost position of the drawing. On the other hand, the spool 241 of the B-2 release valve 24 is fixed in its lower position of the drawing because the solenoid valve SL3 signal pressure ($P_{SL3}$) is fed.

Figure 7:
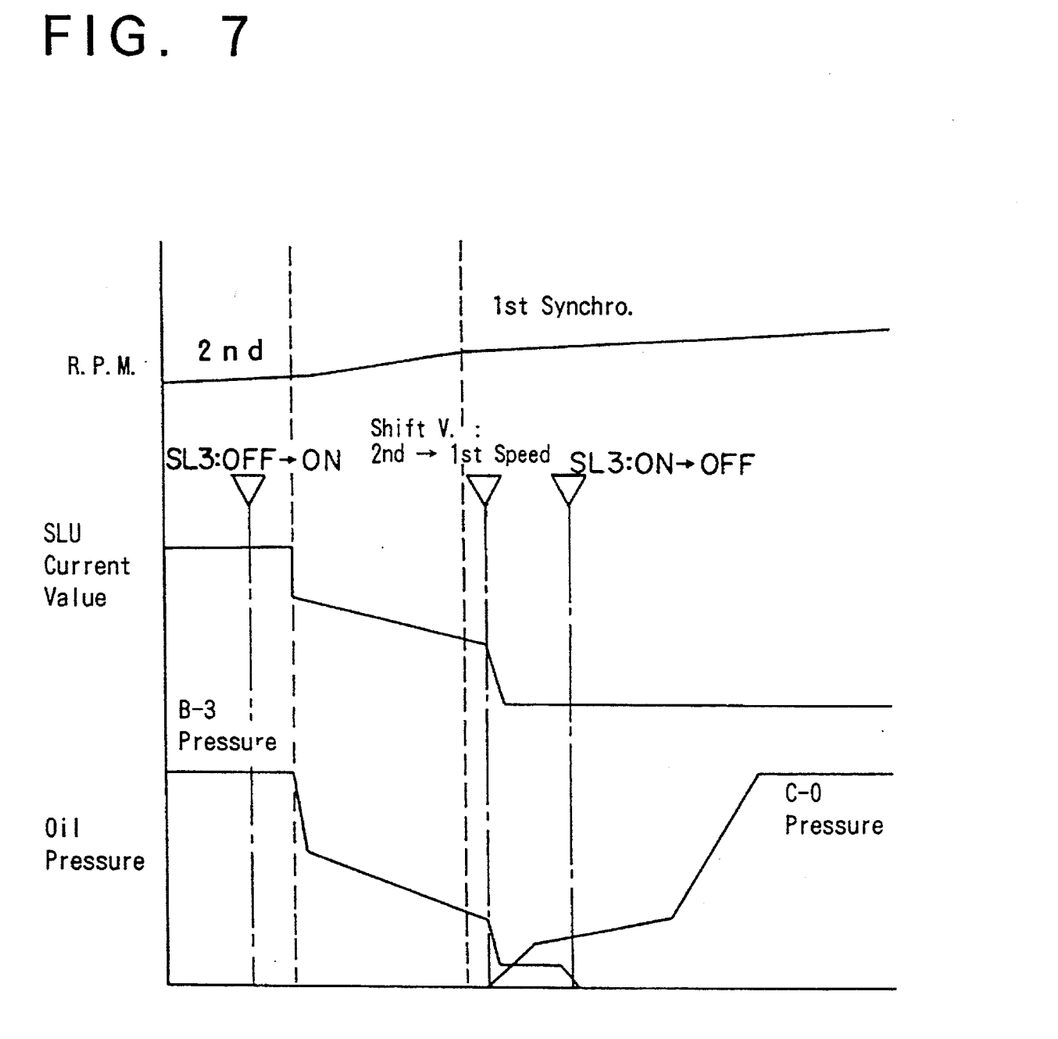
FIG. 7 is a time chart of the automatic transmission at a 2nd→1st shifting time.

(2) 2nd→1st Shift Control Operations (FIG. 7)

Simultaneously with a shift decision, the output of the linear solenoid valve SLU is increased to 100% to prepare the drain control of the brake B-3 pressure. Next, the solenoid valve SL3 is switched from OFF to ON to bring the B-2 release valve 24 to the lefthand half position of the drawing to bring the B-3 control valve 25 into a low gain state. From now on, the drainage of the brake B-3 pressure is directly controlled by the output of the linear solenoid valve SLU. After the 1st speed (1st) synchronization, the 1–2 shift valve 21 is changed to its 1st-speed state to interrupt the feed of the brake B-3 pressure to switch the C-0 exhaust valve to start the feed of the C-0 pressure. After the end of the 2nd→1st shift is decided, the solenoid valve SL3 is switched from ON to OFF to return the B-2 release valve 24 to the righthand half position of the drawing to ensure the large drain state of the brake B-2 pressure.

Figure 8:
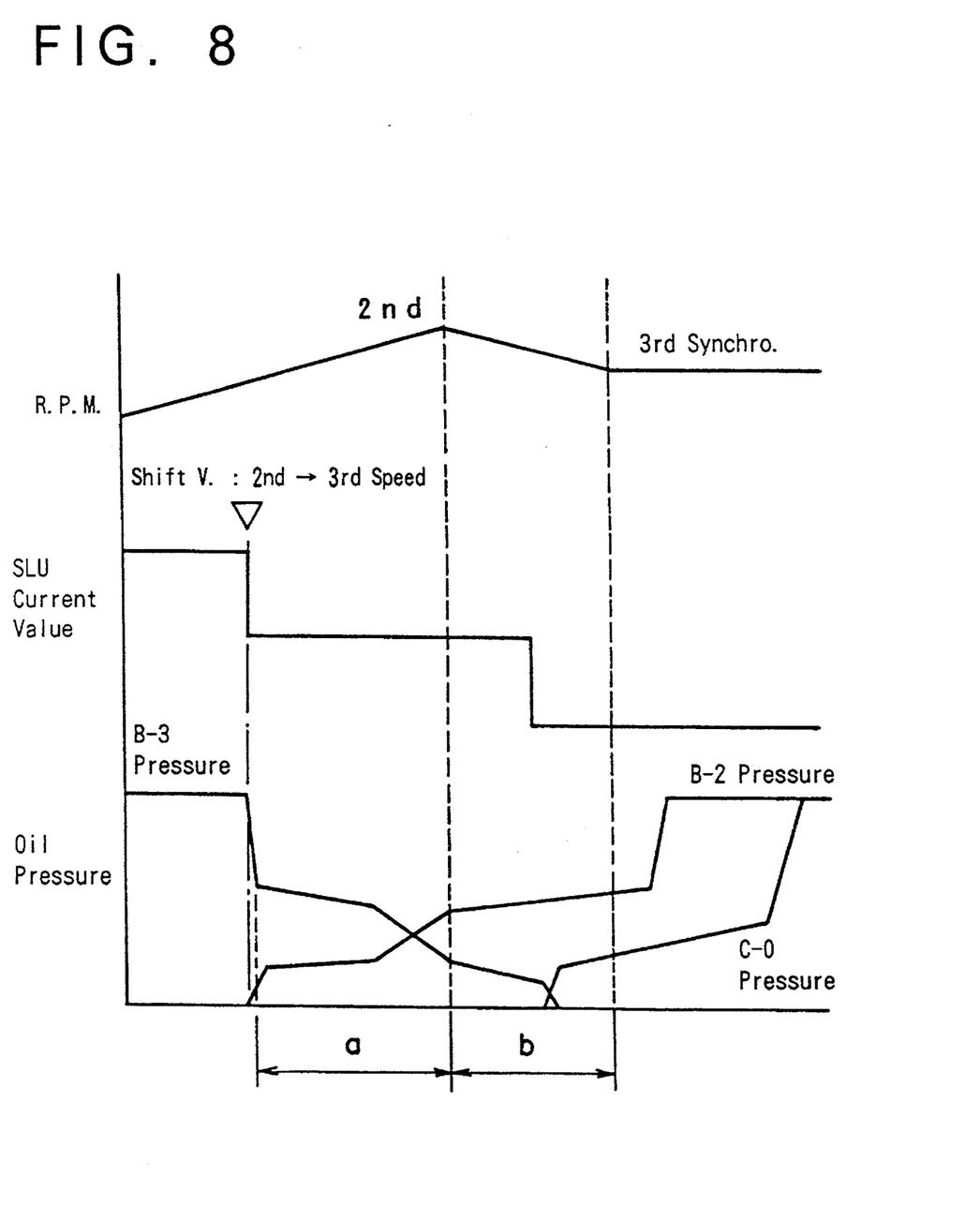
FIG. 8 is a time chart of the automatic transmission at a 2nd→3rd shifting time.

(3) 2nd→3rd Shift Control Operations (FIG. 8)

On the basis of the shift decision, the 2–3 shift valve 22 is switched to the 3rd-speed side to start the feed of the D-range pressure ($P_D$) through the 2–3 shift valve 22 to the servo means of the brake B-2 pressure. By the B-3 control valve 25, the brake B-3 pressure is regulated (as in the section a) to the necessary minimum according to the rise of the brake B-2 pressure. The inertia phase is subjected to the feedback control (as in the section b) by the back pressure control of the B-2 accumulator 27. At the end of the accumulation of the B-2 accumulator 27, moreover, the relay valve 26 is switched to shut the brake B-3 oil passage, thus ending the shift.

Incidentally, in the control system of the aforementioned embodiment, the B-3 control valve 25 is made to have a large gain even at the 3rd→2nd shifting time so that the force against the oil pressure applied from the brake B-2 at the engaging side frictional engagement element to the control valve 25 is retained by increasing the pressure receiving area of the signal pressure ($P_{SLU}$).

As has been described in detail, according to the present embodiment, the third pressure receiving area $A_3$ is given a larger area than that of the second pressure receiving area $A_2$ so that the signal pressure ($P_{SLU}$) is applied in the direction to provide the communication between the output port 255 and the input port 254. At the draining time of the oil pressure from the hydraulic servo 28, the signal pressure ($P_{SLU}$) from the linear solenoid valve SLU acting as the signal pressure generating means is applied to both the second pressure receiving area $A_2$ and the third pressure receiving area $A_3$ having a larger diameter than that of the second pressure receiving area $A_2$ so that the drainage control of the oil pressure is started from the state in which the signal pressure ($P_{SLU}$) acts in the direction to provide the communication between the output port 255 and the input port 254. As a result, it is possible to prevent the pressure drop which might otherwise be caused by the abrupt communication between the output port 255 and the drain port 257. Since, moreover, the signal pressure ($P_{SLU}$) is also applied to the second pressure receiving area $A_2$, the drainage of the oil pressure can be controlled in a high pressure regulating accuracy from a high oil pressure by the small control gain. In the prior art having been described in the head of this specification, on the contrary, the pressure regulator valve is out of control by the solenoid valve while the line pressure being held at a considerable high level. This fails to ensure that the state of the pressure regulator valve is not specified at the start of the drainage of the oil pressure from the hydraulic servo for releasing the frictional engagement elements. As a result, if the pressure regulator valve is in the drain connected state at this time, the oil pressure in the hydraulic servo may be drained at the instant when the interruption of the drain connection is released by the change-over valve, so that the pressure drop occurs. This problem of pressure drop is also solved by the present embodiment.

Generally speaking, moreover, the signal pressure ($P_{SLU}$) from the linear solenoid valve SLU is so dispersed at the initial output stage that the pressure regulating accuracy is deteriorated if the signal pressure is directly applied to the spool 251 from the beginning. In the foregoing embodiment, however, the displacement, if any, of the spool 251 does not provide the communication between the output port 255 and the input port 254, before the signal pressure ($P_{SLU}$) acts at first on the plunger 253 so that the plunger 253 comes into abutment against the spool 251 against the force of the spring 258. As a result, the pressure regulating action of the oil pressure to the hydraulic servo 28 can be caused after the signal pressure ($P_{SLU}$) reaches a slightly higher output valve than that of a large dispersion.

Although the present invention has been described in detail in connection with its embodiment, it should not be limited thereto but can have its specific construction modified in various manners within the scope of the claims.

What is claimed is:

1. A hydraulic control system for an automatic transmission comprising: a frictional engagement element; a hydraulic servo for controlling the application/release of said frictional engagement element; an oil feed passage connected to said hydraulic servo for feeding/releasing an oil pressure to said hydraulic servo; a pressure regulator valve disposed in said oil feed passage; and signal pressure generating means for applying a signal pressure to said pressure regulator valve, wherein said oil feed passage includes: a first oil passage for feeding oil pressure to said pressure regulator valve and a second oil passage for feeding oil pressure from said pressure regulator valve to said hydraulic servo, wherein said pressure regulator valve includes: a valve member; an input port connected to said first oil passage; an output port connected to said second oil passage; and a drain port connected to a drain oil passage, wherein said valve member has: a first pressure receiving area for receiving pressure from said second oil passage, as a feedback pressure for moving said valve member to a position providing communication between said output port and said drain port; a second pressure receiving area for receiving said signal pressure whereby said valve member is moved to a position providing communication between said output port and said drain-port; and a third pressure receiving area having an area different from that of said second pressure receiving area, and wherein said signal pressure generating means feeds the signal pressure to said third pressure receiving area at all times and selectively feeds the signal pressure to said second pressure receiving area.

2. A hydraulic control system for an automatic transmission according to claim 1, wherein the third pressure receiving area of said valve member has a larger diameter than that of said second pressure receiving area and is urged by receipt of said signal pressure toward a position providing communication between said output port and said input port.

3. A hydraulic control system for an automatic transmission according to claim 1, wherein said valve member includes: a spool having said first pressure receiving area; and a plunger arranged coaxially with said spool and having said second and third pressure receiving areas, and further comprising a spring arranged between said spool and said plunger, and wherein said spring urges said spool and said plunger apart from each other.

4. A hydraulic control system for an automatic transmission according to claim 1, wherein said frictional engagement element is applied/released to effect a shift from one gear stage to another gear stage, wherein said signal pressure generating means includes a change-over valve for switching between application and blocking of said signal pressure to said second pressure receiving area, and wherein said change-over valve applies said signal pressure to said pressure receiving area at least in effecting a shift from a first gear stage to a second gear stage and blocks receipt of said signal pressure by said second pressure receiving area at the end of the shift.

5. A hydraulic control system for an automatic transmission according to claim 1, wherein said frictional engagement element is a first frictional engagement element, and further comprising:

a second frictional engagement element applied when said first frictional engagement element is released; and a second hydraulic servo for controlling the application/release of said second frictional engagement element, and wherein said valve member has a fourth pressure receiving area for receiving the pressure applied to said second hydraulic servo to urge said valve member toward the position providing communication between said output port and said drain port.

6. A hydraulic control system for an automatic transmission according to claim 5, wherein said first frictional engagement element and said second frictional engagement element establish a predetermined gear stage when said first frictional engagement element is released while said second frictional engagement element is applied, and wherein said change-over valve interrupts the application of said signal pressure to said second pressure receiving area at least in establishing said predetermined gear stage.

* * * * *